United States Patent
Wu (10) Patent No.: US 11,241,358 B2
(45) Date of Patent: Feb. 8, 2022

(54) ROTATABLE LEG MASSAGE DEVICE

(71) Applicants: Dong-Her Wu, Chang-Hua Hsien (TW); IREST HEALTH SCIENCE AND TECHNOLOGY CO.,LTD, Iaxing (CN)

(72) Inventor: Dong-Her Wu, Chang-Hua Hsien (TW)

(73) Assignees: Dong-Her Wu, Chang-Hua Hsien (TW); IREST HEALTH SCIENCE AND TECHNOLOGY CO., LTD., Zhejiang Province (CN)

( * ) Notice: Subject to any disclaimer, the term of this patent is extended or adjusted under 35 U.S.C. 154(b) by 338 days.

(21) Appl. No.: 16/554,578

(22) Filed: Aug. 28, 2019

(65) Prior Publication Data

US 2020/0206070 A1    Jul. 2, 2020

(30) Foreign Application Priority Data

Dec. 28, 2018 (TW) ................. 107147802

(51) Int. Cl.
*A61H 15/00* (2006.01)

(52) U.S. Cl.
CPC . *A61H 15/0078* (2013.01); *A61H 2015/0021* (2013.01); *A61H 2201/0119* (2013.01);
(Continued)

(58) Field of Classification Search
CPC .... A61H 2201/0119; A61H 2201/0157; A61H 2201/5066; A61H 2201/1215; A61H 2201/164; A61H 2201/0192; A61H 2201/0149; A61H 2201/1207; A61H 2201/0176; A61H 2201/12; A61H 2201/123; A61H 2201/1642; A61H 15/00; A61H 15/0078; A61H 2015/0021; A61H 2015/0014; A61H 23/00; A61H 23/004; A61H 23/006; A61H 39/00; A61H 39/02; A61H 39/04; A61H 2203/0425; A61H 2203/0431; A61H 2203/0437; A61H 2203/0456; A61H 2203/0462; A61H 2205/10; A61H 2205/106; A61H 2205/108; A61H 2205/12
(Continued)

(56) References Cited

U.S. PATENT DOCUMENTS

5,599,282 A * 2/1997 Ito ...................... A61H 15/0078
600/102
6,196,984 B1 * 3/2001 Hashimoto ........ A61H 15/0078
601/122
(Continued)

*Primary Examiner* — Justine R Yu
*Assistant Examiner* — Kelsey E Baller (57) ABSTRACT

The rotatable leg massage device has a base and a swinging arm. The swinging arm has a massaging end and a swinging end, the massaging end provided with a respective massaging roller on two sides. A second motor is disposed inside of the massage end and configured to rotate the two massaging rollers. The swinging end is disposed in front of the assembling base, and both sides of the swinging end are respectively provided with a swinging gear. A central aperture of each swinging gear is aligned with the through apertures of the assembling base and a shaft passing through all four apertures, the two swinging gears engages the two driving gears of the first motor, and the first motor is configured to drive the swinging arm to rotate around the base.

7 Claims, 13 Drawing Sheets

(52) U.S. Cl.
CPC ............... *A61H 2201/0157* (2013.01); *A61H 2201/0192* (2013.01); *A61H 2201/1215* (2013.01); *A61H 2201/164* (2013.01); *A61H 2201/1671* (2013.01); *A61H 2201/5066* (2013.01)

(58) Field of Classification Search
USPC ........................................ 601/23, 24, 26–36
See application file for complete search history.

(56) References Cited

U.S. PATENT DOCUMENTS

| | | | | |
|---|---|---|---|---|
| 6,740,016 | B1 * | 5/2004 | Lee | A61H 1/0244 |
| | | | | 482/146 |
| 6,837,831 | B2 * | 1/2005 | Lee | A61H 1/0214 |
| | | | | 482/57 |
| 7,322,949 | B2 * | 1/2008 | Shimizu | A61H 23/02 |
| | | | | 601/133 |
| 2010/0029449 | A1 * | 2/2010 | Kim | A63B 23/0429 |
| | | | | 482/121 |

* cited by examiner

ROTATABLE LEG MASSAGE DEVICE

BACKGROUND of INVENTION

Field of Invention

The present invention relates to a massage device, and more particularly to a rotatable leg massage device.

Description of the Related Art

In modern life, people are under various stress and are easily suffer body aches. Therefore, various massage devices are employed to massage different parts of the body to ease the body tension. The general massage devices are divided into a body massage device such as a massage chair, a massage bed, etc., and a partial massage device such as a shoulder-neck massage belt, a waist massage belt or a calf and foot massage machine, etc. All of them employ rollers, airbags or vibration to generate mechanical press on corresponding body parts to relieve the tension of the muscles.

In particular, there are more and more people suffer soreness, tightness and water retention in their lower limbs. Therefore, lower limb massage mechanisms are developed to provide massage for lower limbs and feet. The lower limb massage device can be used alone or in combination with a massage chair. However, common lower limb massage mechanisms usually has a complicated massage mechanism which is requires too much space.

On the other hand, the lower limb massage mechanism in a massage chair can be used to lift and lower the massage chair to enhance the massage effect, but limits the use state of the lower limb massage mechanism. The lower limb massage mechanism requires the user sits down and places both legs on the lower limb massage mechanism, and the effective areas are limited to the calf, ankle or sole Therefore, it is desirable to provide a rotatable leg massage device to mitigate and/or obviate the aforementioned problems.

SUMMARY OF THE INVENTION

An objective of present invention is to provide a rotatable leg massage device, which is capable of improving the above-mention problems.

In order to achieve the above mentioned objective, The rotatable leg massage device has a base and a swinging arm. The swinging arm has a massaging end and a swinging end, the massaging end provided with a respective massaging roller on two sides. A second motor is disposed inside of the massage end and configured to rotate the two massaging rollers. The swinging end is disposed in front of the assembling base, and both sides of the swinging end are respectively provided with a swinging gear. A central aperture of each swinging gear is aligned with the through apertures of the assembling base and a shaft passing through all four apertures, the two swinging gears engages the two driving gears of the first motor, and the first motor is configured to drive the swinging arm to rotate around the base.

Other objects, advantages, and novel features of invention will become more apparent from the following detailed description when taken in conjunction with the accompanying drawings.

DETAILED DESCRIPTION OF THE PREFERRED EMBODIMENT

First, please refer to FIGS. 1-5. The rotatable leg massage device comprises: a base 10 and a swinging arm 20. Two sides of the base 10 are each provided with a foot stand 11. The base 10 has an assembling base 12 on a top surface, and the assembling base 12 is provided with an assembling groove 121 for securing a first motor 13. A driving end 131 of the first motor 13 is exposed outside of the assembling base 12, and sides of the driving end 13 is respectively provided with a driving gear 132. A through aperture 14 is respectively provided on each side of the assembling base 12, each side of the through aperture 14 of the assembling base is provided with a bearing member 141, and a protecting cover 15 is mounted on each side of the assembling base 12. Each of the two protecting covers 15 is provided with an accepting slot 151. The swinging arm 20 has a massaging end 21 and a swinging end 22. The massaging end 21 is provided with a respective massaging roller 23 on two sides, the two massage rollers 23 each further comprise a circular disk 231 connected to a shaft 232, and the two circular disks 231 are provided with a plurality of massaging units 233 there between. The two massaging rollers 23 are both covered by a cloth cover 234. A second motor 24 is disposed inside of the massage end 21 and configured to rotate a central shaft 241 and the shaft 232 of the two massaging rollers 23. The swinging end 22 is disposed in front of the assembling base 12, both sides of the swinging end 22 is respectively provided with a swinging gear 25. A central aperture 251 of each swinging gear 25 is aligned with the through apertures 14 of the assembling base 12 and a shaft 26 passes through all four apertures 251, 14, the two swinging gears 25 engages the two driving gears 132 of the first motor 13, and the first motor 13 is configured to drive the swinging arm 20 to rotate around the base 10.

A first limit switch 16 is mounted in front of the assembling base 12 of the base 10, a second limit switch 17 is mounted inside one of the protecting covers 15 at a position between 90° to 180°, and the first and second limit switches 16, 17 are both electrically connected to the first motor 13 for controlling.

A diameter of the driving gear 132 is smaller than a diameter of the swinging gear 25, which ensures a slow swing movement of the swinging arm 20.

Figure 1:
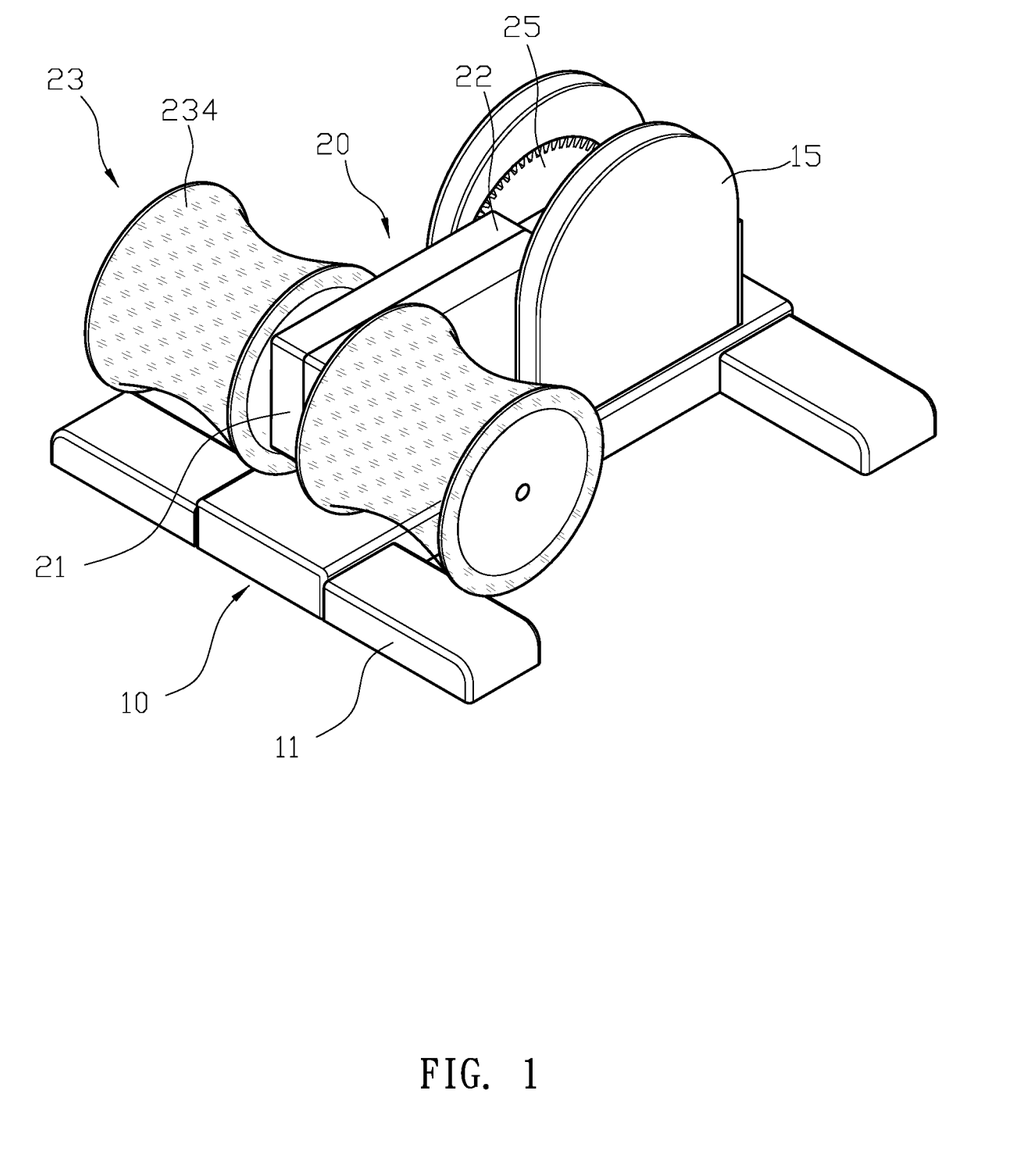
FIG. 1 is a perspective view of a preferred embodiment according to the present invention.
Figure 2:
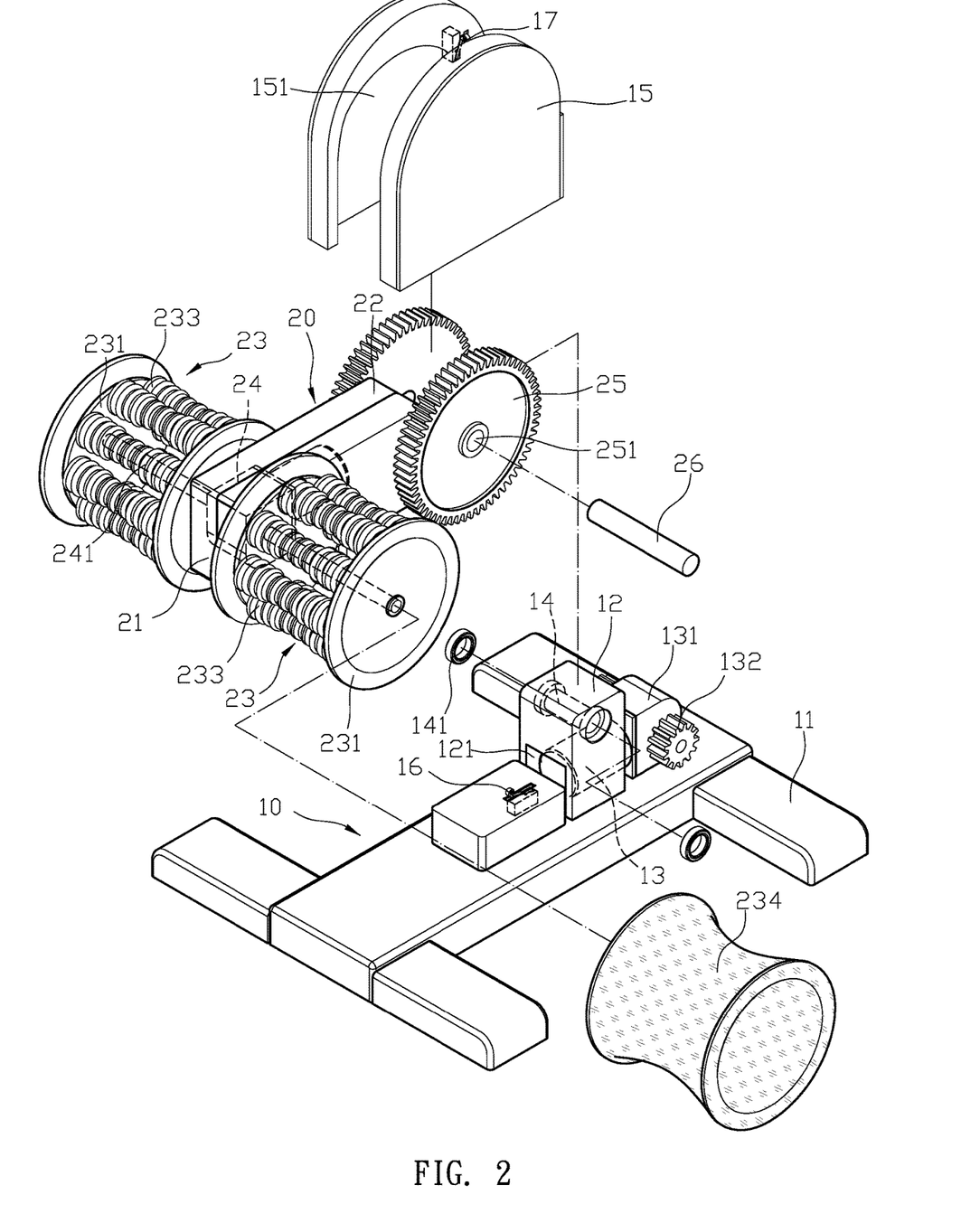
FIG. 2 is an exploded view of the preferred embodiment according to the present invention.
Figure 3:
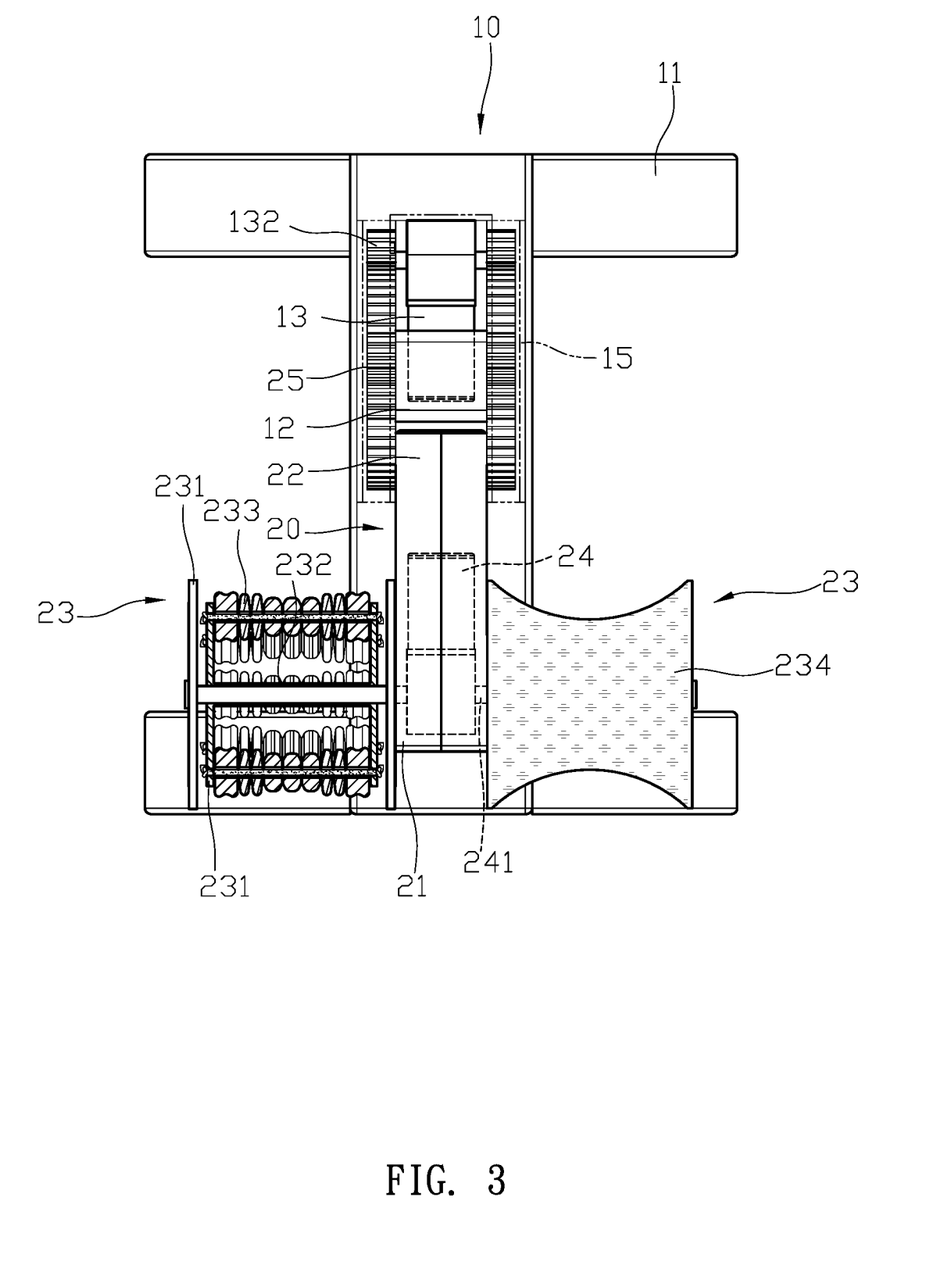
FIG. 3 is a plan view of the preferred embodiment according to the present invention.
Figure 4:
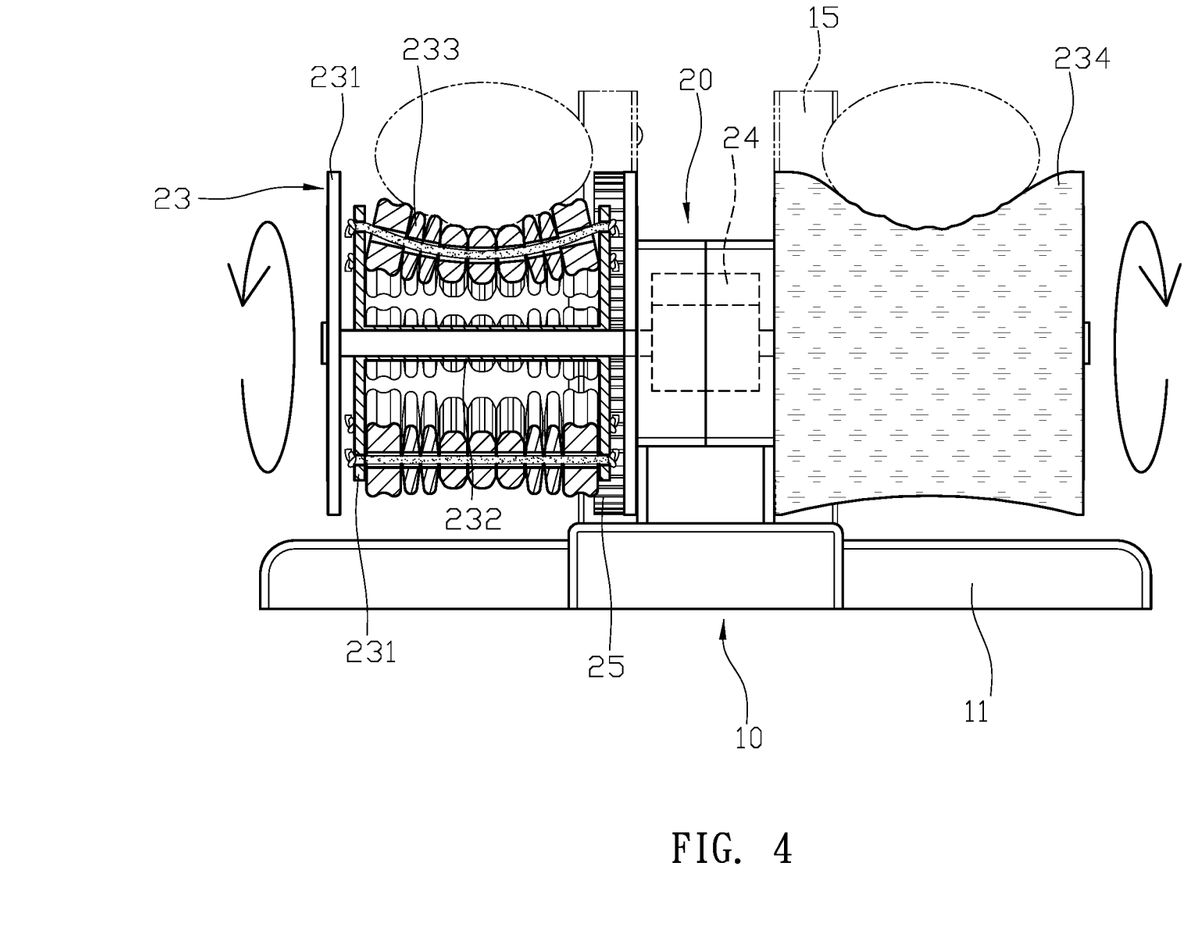
FIG. 4 is a front view of the preferred embodiment according to the invention
Figure 5:
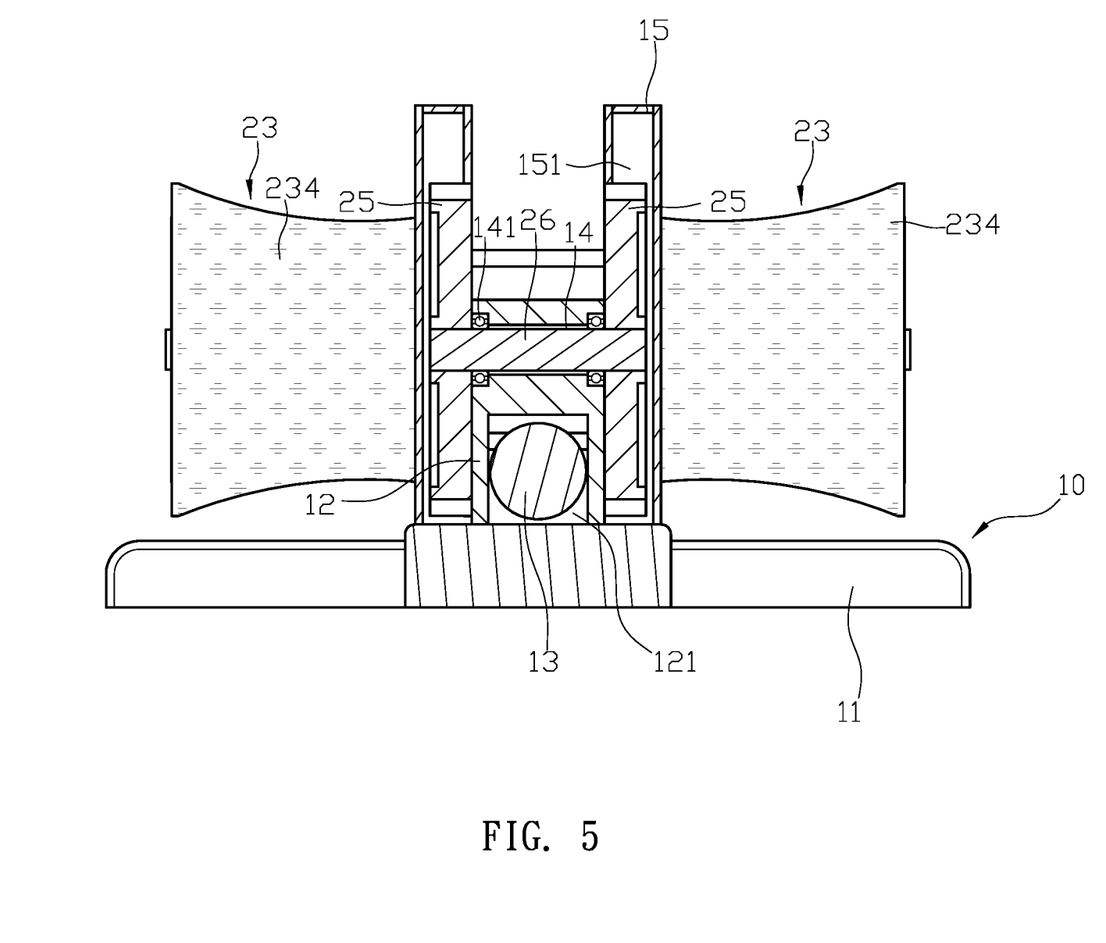
FIG. 5 is a schematic cross-sectional view showing the swing state of the preferred embodiment according to the present invention.
Figure 6:
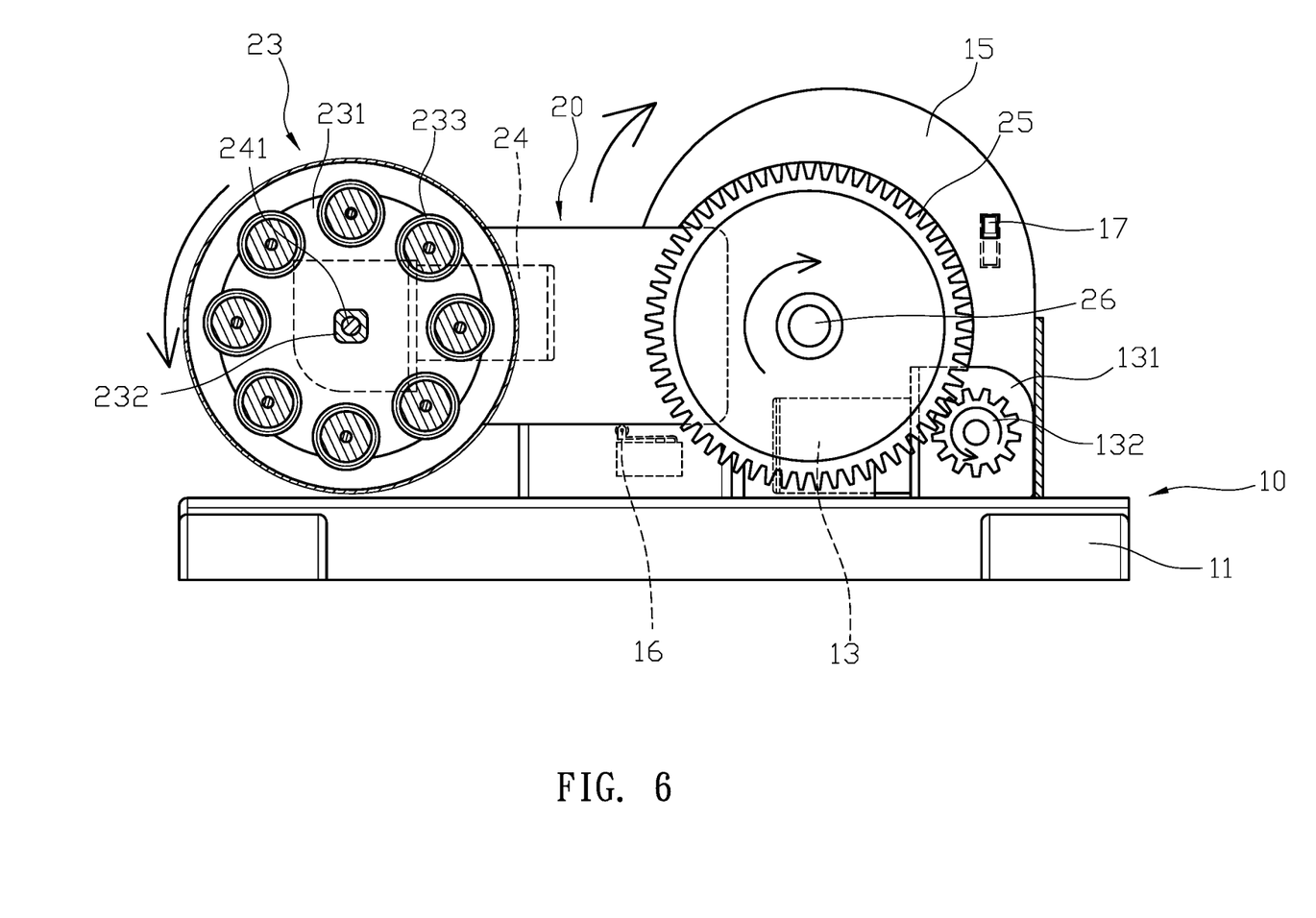
FIG. 6 is a side view of the preferred embodiment according to the invention.
Figure 7:
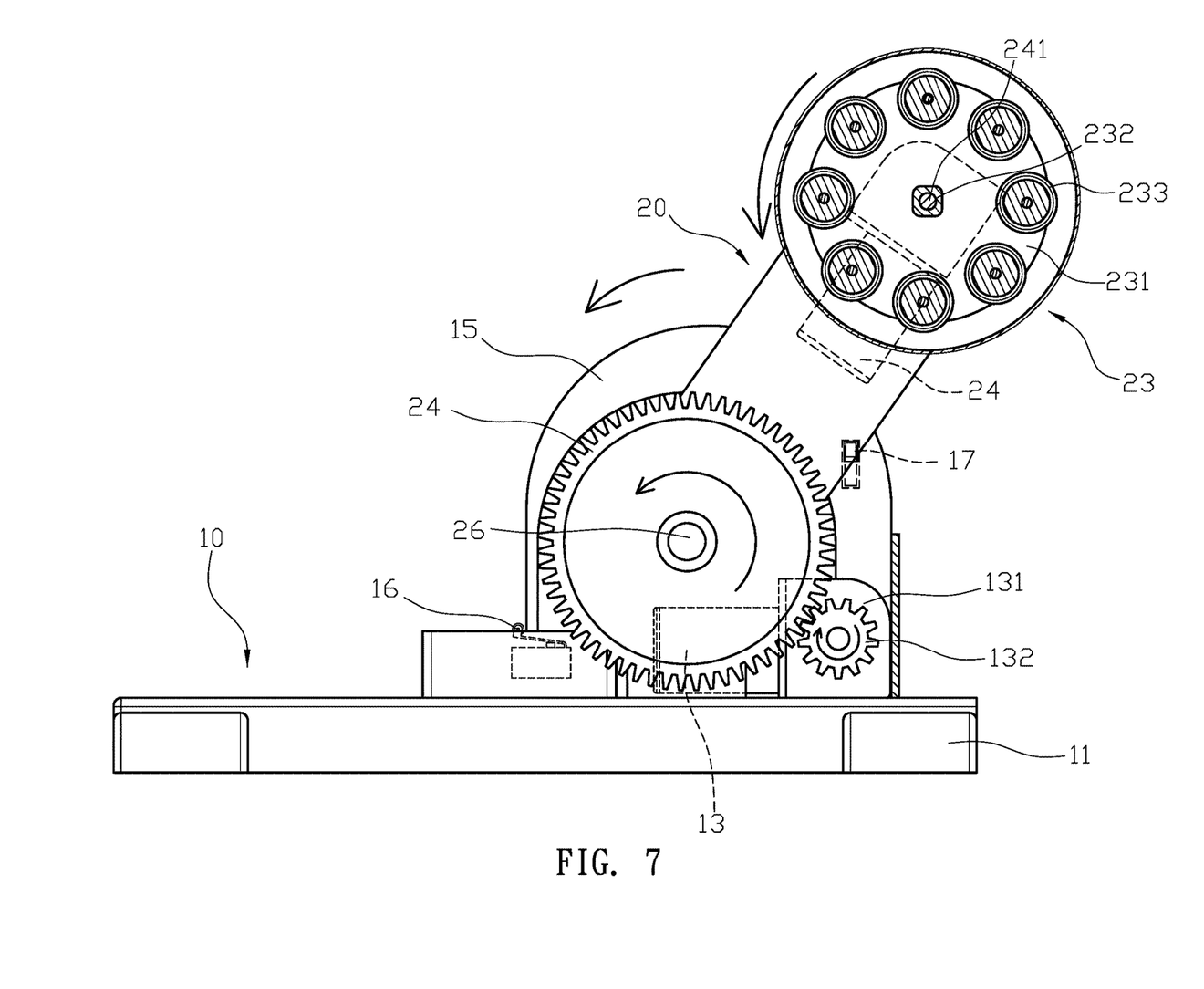
FIG. 7 is a schematic view showing the swing state of the preferred embodiment according to the present invention.

For the structure and operation of the previous embodiment, please refer to FIGS. 1-5 with FIGS. 6 and 7. The massage end 21 of the swinging arm 20 drives the two massage roller 23 to rotate via the second motor 24, and the swinging end 22 of the swinging arm 20 is mounted at the front side of the assembling base 12. The shaft 26 is used to limit the swinging gears 25 on both sides of the swinging end 22 to the assembling base 12 while the two swinging gears 25 engage with the driving gear 132 of the first motor 13. When the first motor 13 is activated, the power is transmitted to the swinging gears 25 via the driving gear 132, and the shaft 26 drives the swinging arm 20 to swing on the assembling base 12. The accepting space 151 of the protecting cover 15 on both sides of the assembling base 12 is respectively covering and limiting the swinging gear 25 to avoid the foreign object jamming. Furthermore, the first limit switch 16 is disposed in front of the assembling base 12 of the base 10, the second limit switch 17 is disposed on the inner side of the protecting cover 15; when the swinging arm 20 swings forward and touches the first limit switch 16 of the base 10, the first motor 13 is switched to reverse rotation operation, and the swinging arm 20 swings in the opposite direction. Alternatively, when the swinging arm 20 swings back and touches the second limit switch 17 of the protecting cover 15, the first motor 13 is switched to forward rotation operation, so that the swinging arm 20 swing forward to the front of the base 10, the swinging arm 20 swings forward. Moreover, the two massage roller 23 of the massage end 21 provides massage effect for the lower limb, and the swing angle of the swinging arm 20 on the base 10 is greater than 90°, which greatly enhances the massage range on the lower limb.

In addition, the previous switching method of the second motor 24 by using the limit switch is only one of the preferred embodiment of the present invention, and is not limited thereto, it can also be accomplished by setting a predetermined numbers of rotation of the second motor 25, other sensing switches or gyroscopes for the switching, etc. to provide the switching effect for the rotation direction of the second motor 25.

Figure 8:
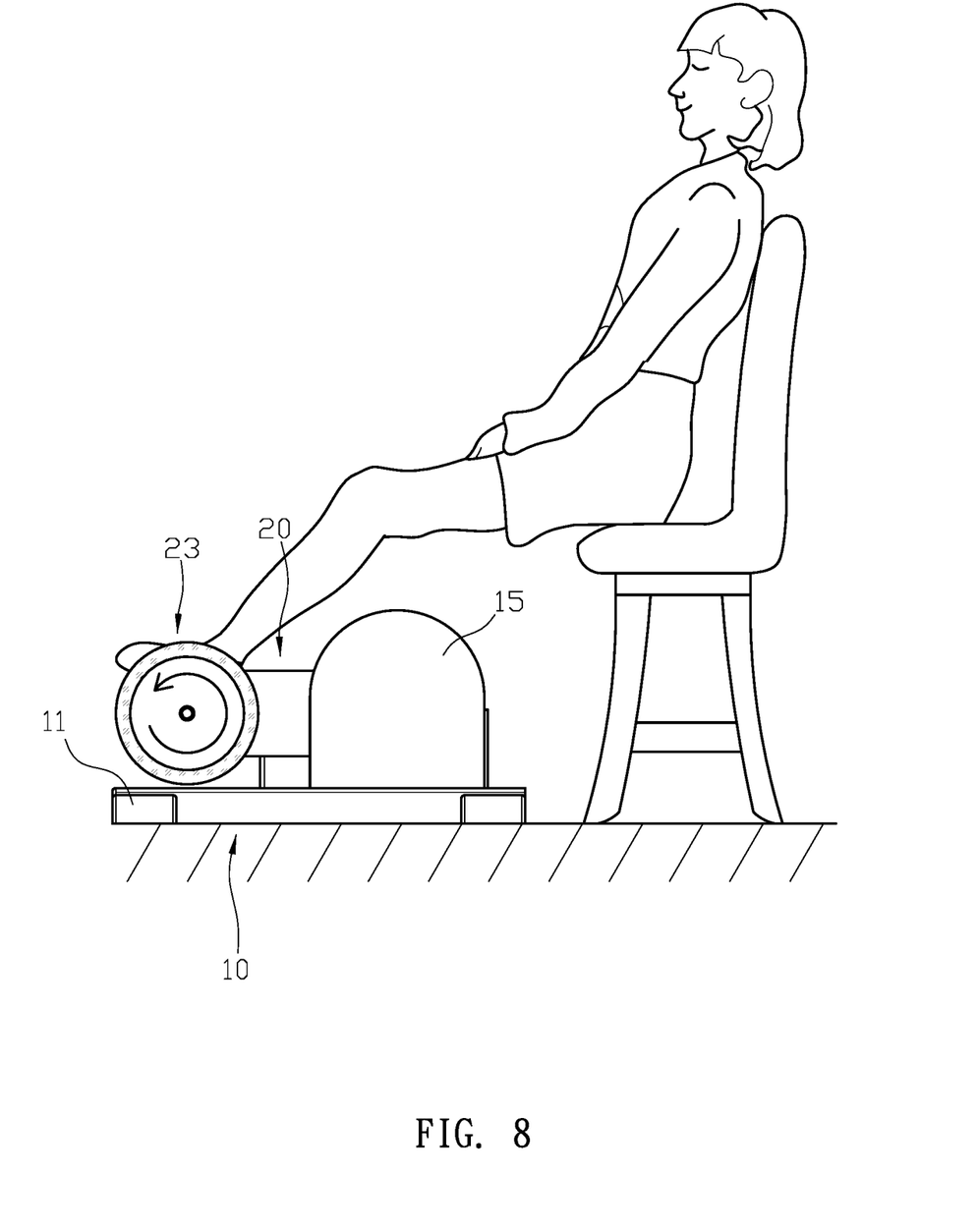
FIG. 8 is a schematic view showing a user sitting on the preferred embodiment according to the present invention.
Figure 9:
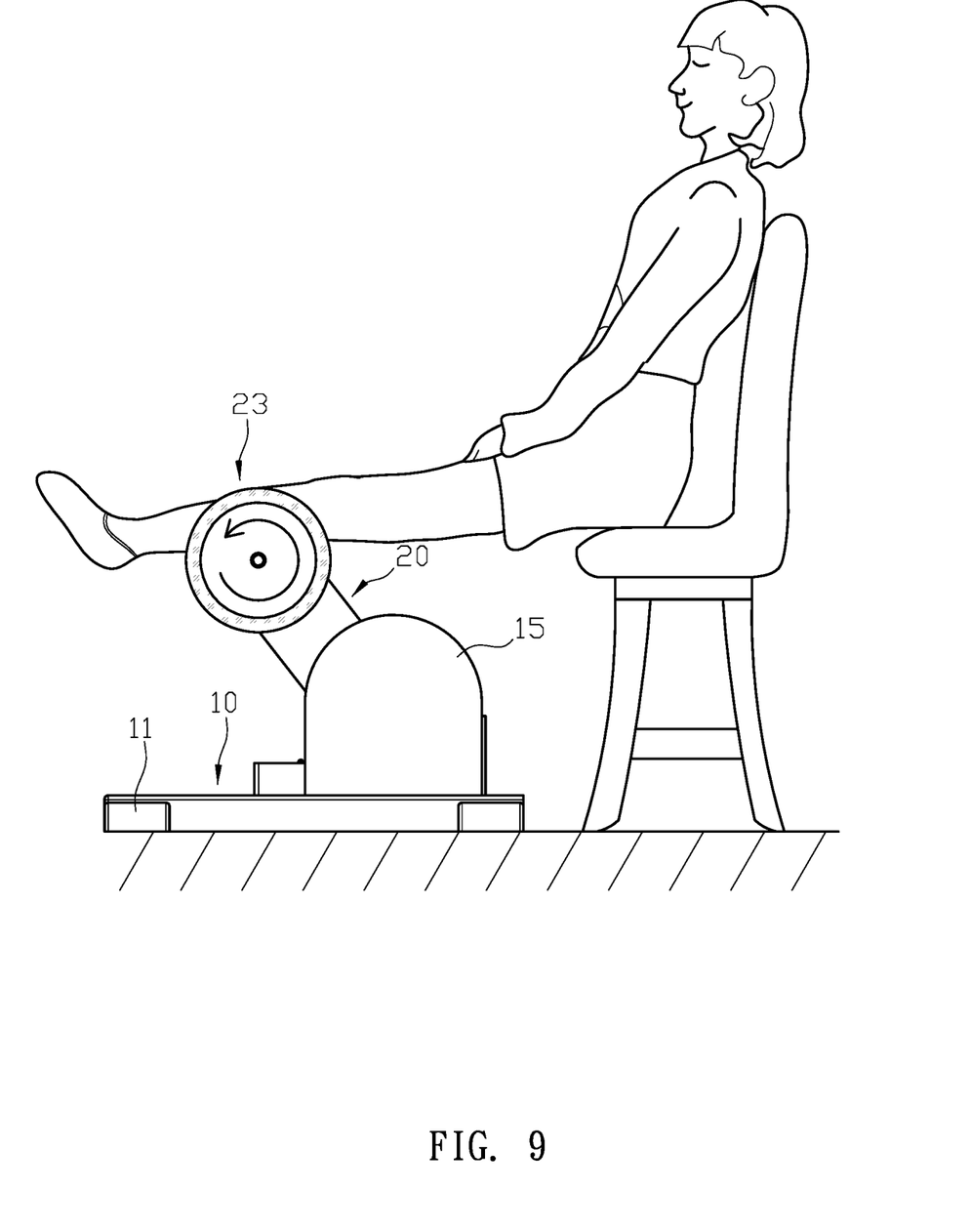
FIG. 9 is another schematic view showing a user sitting on the preferred embodiment according to the present invention.

When the above structure is actually operated, as shown in FIGS. 7, 8, and 9, the user sits on a chair, the massage device is placed in front of the chair, and user's feet are placed on the swinging arm 20. When the first motor 13 and the second motor 24 are simultaneously activated, the two massaging rollers 23 are rotated by the first motor 13 and massage the lower limb muscles via the massaging unit 233, while the swinging arm 20 moves with the second motor 25, and the two massaging rollers 23 of the massaging end 21 massages along the feet, ankles, calves, back of the knees and thighs to achieve a lower limb circulation massage. Furthermore, when the calves are been massaged, the feet can be lifted up to relax the leg muscles, which greatly enhances the massage effect.

Secondly, the first motor 13 and the second motor 24 are connected to a controller (not shown), and the power of the first motor 13 can be controlled by the controller to adjust the speed of the two massaging rollers 23 and the massage force. The controller can also be used to control the second motor 24 to be on or off, and by fixing the angle of the swinging arm 20 to provide a fixed-point massage at the sole of the foot, the calf muscle, the muscle of the back of the knee or the thigh muscle.

Figure 10:
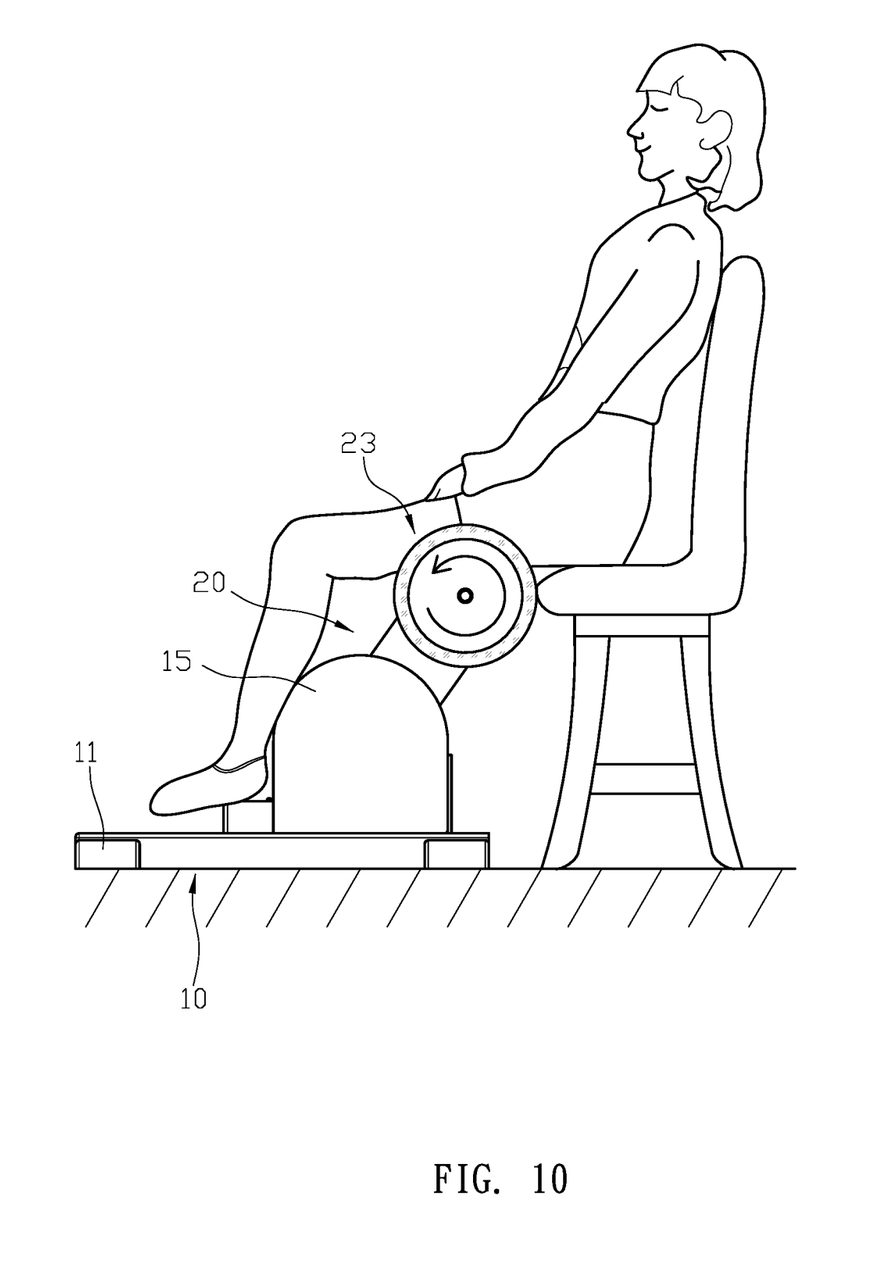
FIG. 10 is another schematic view showing a user sitting on the preferred embodiment according to the present invention.
Figure 11:
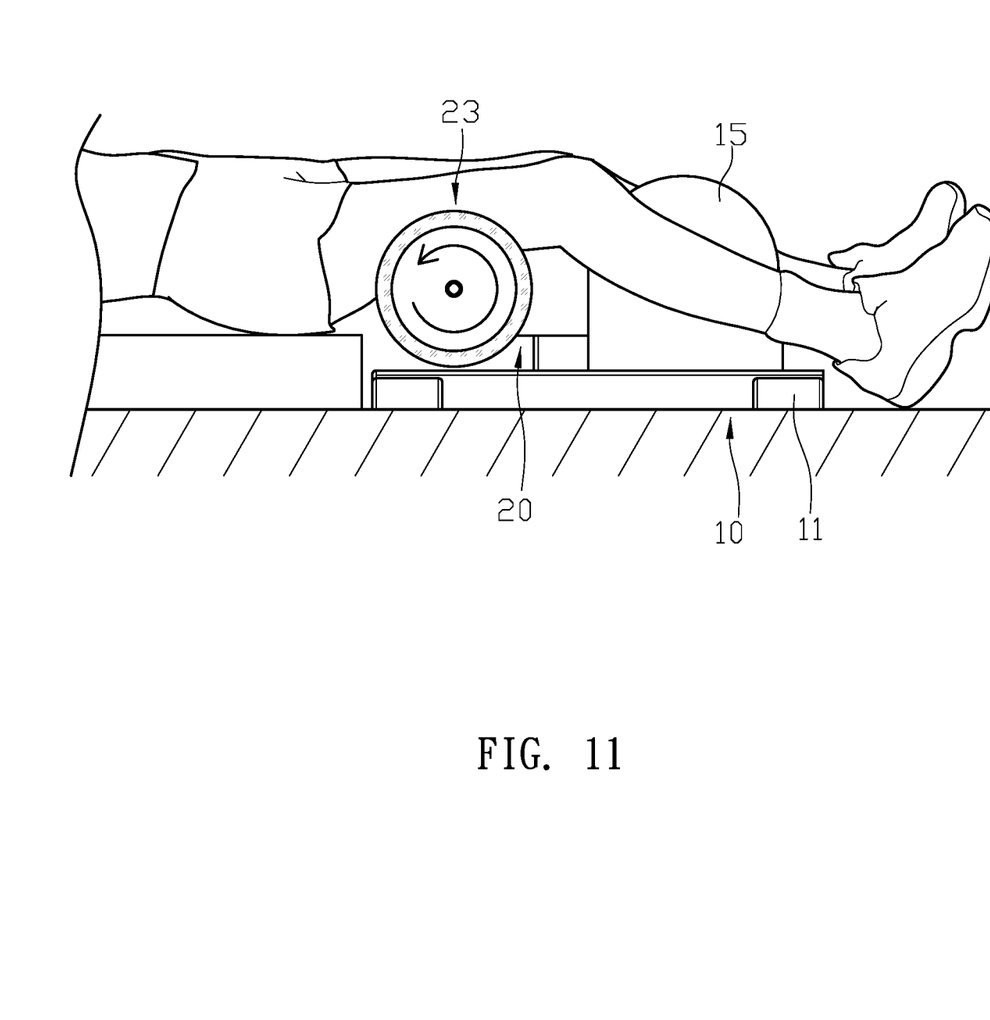
FIG. 11 is a schematic diagram showing the user lying down on the preferred embodiment according to the present invention.
Figure 12:
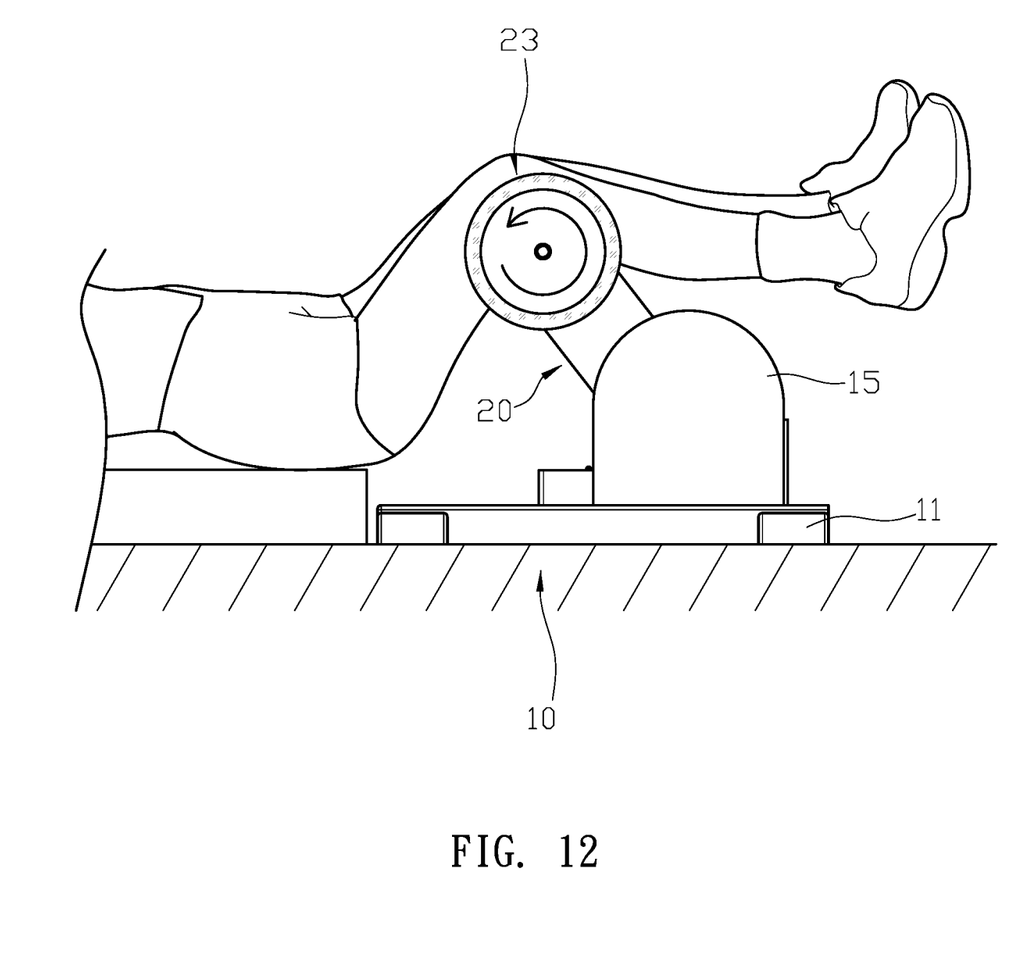
FIG. 12 is another schematic diagram showing the user lying down on the preferred embodiment according to the present invention.

In addition, when the massage mechanism is used, the angle of the swinging arm 20 can be adjusted freely, so the user can have the lower limb be massaged while lying down or sleeping. Please also refer to the FIGS. 10, 11 and 12, when the swinging arm 20 is brought up by the second motor 24 to form a raised state, the leg can be supported upwards and higher than the heart, which helps the blood return to the heart and the lungs for oxygen to help leg muscles to rest and relax, and then the massaging rollers 23 massage the muscle to eliminate soreness, fatigue and other discomforts for better blood circulation.

Figure 13:
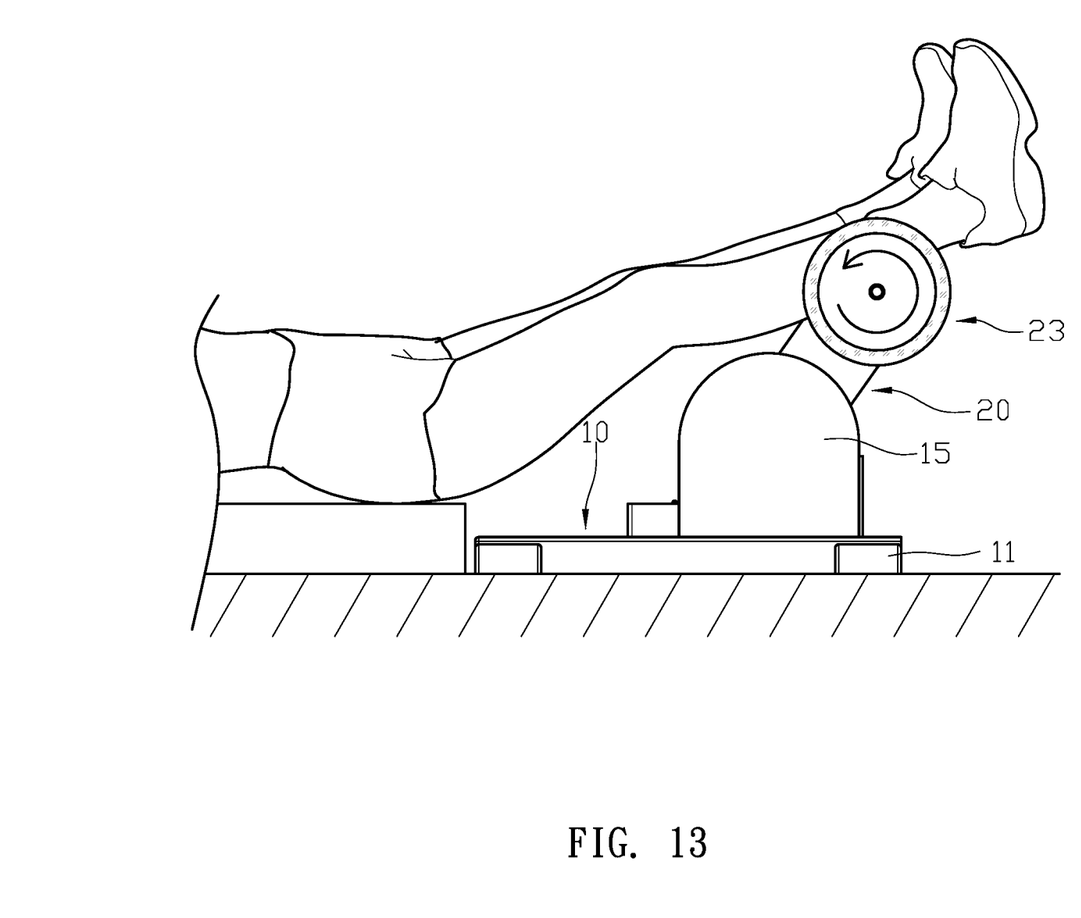
FIG. 13 is another schematic diagram showing the user lying down on the preferred embodiment according to the present invention.

For another embodiment of the structure, please refer to FIGS. 13, 14, and 15. The bottom side of the swinging arm 22 of the swinging arm 20 is provided with an accepting slot 221, both sides of the accepting slot 221 have an assembling aperture 222 passing through the swinging end 22, the second motor 24 is housed in the accepting slot 221, and the shaft rods 251 on both sides of the second motor 24 is passed through the two assembling apertures 222 connecting the swinging end 22 between the two assembling posts 12. Since, the second motor 24 is fixed between the two assembling posts 12, the second motor 24 is capable of driving the two shaft rods 251 to rotate, and the swinging arm 20 is driven by the two shaft rods 251 between the two assembling posts 12. The first limit switch 14 in front of the two assembling posts 12 of the base 10 and the second limit switch 26 on outside of the swinging arm 20 are configured for controlling the swinging movements of the swinging arm 20 and the two massaging rollers 23 of the massaging end 21 to achieve the massaging effect.

With the structure of the above specific embodiment, the following benefits can be obtained: (1) The massaging mechanism of the present invention is composed of a base 10 and a swinging arm 20, and the massaging end 21 of the swinging arm 20 is provided with the two massaging rollers 23. When the structure is used, the simultaneous actuations of the first motor 13 and the second motor 24 can achieve the swing circulation massage effect on the lower limbs, which helps to expand the range of massage. Furthermore, when the swinging arm 20 swings upward to lift the lower limb for support to achieve muscle relaxation, thereby improving the massage effect of the lower limb muscles.

(2) The swinging arm 20 can also be switched for a fixed point massage, which can locally emphasizes the lower limb muscles with more soreness and discomfort, and increase the practicability of the structure.

(3) The massage device can operate when the user is sitting or lying down with the swinging arm 20 when the user is lying down. When the swinging arm 20 is brought up by the second motor 24 to form a raised state, the leg can be supported upwards and higher than the heart, which helps the blood return to the heart and the lungs for oxygen to help leg muscles to rest and relax, and then the massaging rollers 23 massage the muscle to eliminate soreness, fatigue and other discomforts for better blood circulation.

(4) The swinging arm 20 can be swung to the bottom to be horizontal with the base 10, which greatly reduces the volume of the massage device for easy storage.

Although the present invention has been explained in relation to its preferred embodiment, it is to be understood that many other possible modifications and variations can be made without departing from the spirit and scope of invention as hereinafter claimed.

What is claimed is:

1. A rotatable leg massage device comprising:
a base having an assembling base on a top surface, the assembling base provided with an assembling groove for securing a first motor, a driving end of the first motor exposed outside of the assembling base, two sides of the driving end respectively provided with a driving gear, a through aperture respectively provided on each side of the assembling base, and a protecting cover mounted on each side of the assembling base;
a swinging arm having a massaging end and a swinging end, the massaging end provided with a respective massaging roller on two sides, a second motor disposed inside of the massage end and configured to rotate the two massaging rollers, the swinging end disposed in front of the assembling base, two sides of the swinging end respectively provided with a swinging gear, a central aperture of each swinging gear aligned with the through apertures of the assembling base and a shaft passing through all four apertures, the two swinging gears engaging the two driving gears of the first motor, and the first motor configured to drive the swinging arm to rotate around the base.

2. The rotatable leg massage device as claimed in claim 1, wherein two sides of the base are each provided with a foot stand, a first limit switch is mounted in front of the assembling base, a second limit switch is mounted inside one of the protecting covers at a position between 90° to 180°, and the first and second limit switches are both electrically connected to the first motor.

3. The rotatable leg massage device as claimed in claim 1, wherein each of the two protecting covers is provided with an accepting slot for positioning each of the swinging gears, respectively.

4. The rotatable leg massage device as claimed in claim 1, wherein the two massage rollers each further comprise a circular disk connected to a shaft, and the two circular disks are provided with a plurality of massaging units there between.

5. The rotatable leg massage device as claimed in claim 1, wherein the two massaging rollers are both covered by a cloth cover.

6. The rotatable leg massage device as claimed in claim 1, wherein each side of the through aperture of the assembling base is provided with a bearing member.

7. The rotatable leg massage device as claimed in claim 1, wherein a diameter of each of the driving gears is smaller than a diameter of each of the swinging gears.

* * * * *